United States Patent [19]
Reber

[11] Patent Number: 5,113,358
[45] Date of Patent: May 12, 1992

[54] WEB CALIPER MEASURING SYSTEM

[75] Inventor: Eric J. Reber, Rockford, Ill.

[73] Assignee: Barber-Colman Company, Rockford, Ill.

[21] Appl. No.: 500,805

[22] Filed: Mar. 28, 1990

[51] Int. Cl.$^5$ .................... G01B 17/00; G01B 15/00
[52] U.S. Cl. ............................. 364/563; 209/590; 209/570; 209/556; 73/600
[58] Field of Search ............... 364/561, 563, 556; 209/556, 558, 570, 590; 250/339; 356/429–431; 73/596, 610, 614, 616, 627, 159, 601, 602, 607

[56] References Cited
U.S. PATENT DOCUMENTS

| | | | |
|---|---|---|---|
| 3,825,822 | 7/1974 | Förster | 209/570 X |
| 4,124,300 | 11/1978 | Mead et al. | 356/429 |
| 4,175,441 | 11/1979 | Urbanek et al. | 73/599 |
| 4,407,209 | 9/1977 | Allport | 364/563 |
| 4,519,249 | 5/1985 | Hunt | 73/596 |
| 4,574,387 | 3/1986 | Gignoux et al. | 364/563 X |
| 4,789,820 | 12/1988 | Parrent, Jr. et al. | 73/159 X |
| 4,856,337 | 8/1989 | Metala et al. | 73/601 |
| 4,860,229 | 8/1989 | Abbe et al. | 364/563 |
| 4,881,415 | 11/1989 | Hergeth | 364/563 X |
| 4,955,235 | 9/1990 | Metala et al. | 73/601 |

*Primary Examiner*—Joseph L. Dixon
*Attorney, Agent, or Firm*—Leydig, Voit & Mayer

[57] ABSTRACT

A non-contact caliper-type gauge particularly suited for measuring the thickness of a running web. In its preferred form, the system includes a pair of opposed scanning heads defining a gap through which the running web passes, the heads being adapted to transverse across the width of the running web. Each of the heads includes and ultrasonic transducer for directing energy at the web, detecting energy reflected from the face of the web nearest the respective transducer and determining the distance between a reference in the head and the facing surface of the web. One of the heads also includes a transducer, preferably an eddy current transducer, which operates on energy to which the web is transparent. The second transducer senses the distance between the heads thereby to determine any variations in the distance between the heads during traverse. The distances determined by each of the ultrasonic transducers to the respective surfaces of the web are subtracted from the total gap distance to produce a corrected measure of web thickness which is substantially independent of mechanical variations in gap between the heads.

23 Claims, 4 Drawing Sheets

WEB CALIPER MEASURING SYSTEM

FIELD OF THE INVENTION

This invention relates to thickness measuring systems, and more particularly to non-nuclear caliper-type systems capable of accurate determination of the thickness of a running web.

BACKGROUND OF THE INVENTION

Measurement of web thickness is important in many industrial process applications for various purposes such as, for example, process control or quality assurance. Various systems have been devised for measuring the thickness of running webs of material, and often such gauges are mounted such that they can traverse the moving web across its width to provide a profile of web thickness.

One of the techniques used heretofore in measuring web thickness has employed nuclear gauges. Such nuclear gauges usually include a beta source mounted on one side of the web and a detector on the other for detecting emitted radiation not attenuated by the web. Nuclear thickness gauges are preferred in some applications but they have their drawbacks. Among the disadvantages is the reluctance of certain industries to allow use of a source of nuclear radiation. A second feature which is objectionable in some industries is the fact that nuclear detectors primarily measure density, and therefore the thickness estimates they produce are indirect. Accordingly, if the density of the material being measured varies, the accuracy of the thickness measurements will also vary. Pass line variations, i.e., variation in the position of the moving web with respect to the detector, can also be a problem.

Conceptually, ultrasonic gauges can be useful in measuring web thickness since they are capable of accurately detecting the distance between the sensor and the surface of the web at which they are directed. However, when ultrasonic sensors are put into a traversing mechanism for scanning across the web, the expected variation (even in a high quality traversing arrangement) of the scanning head with respect to the web can introduce a degree of error which completely masks the nominal accuracy of the transducers. For example, if it were desired to scan a web of nominal 100 mil thickness with a 1% accuracy, it would be necessary to provide a traversing mechanism with a worst case positional variation of ±0.5 mils. However, the best case that might be expected is a variation in the range of ±10 mils or more, making it impossible to measure a 100 mil web with anything better than ±10% accuracy. Traversing ultrasonic gauges might be useful when measuring substantially thicker webs (on the range of inches) where a 10 mil variation in the traverse mechanism is a small percentage of the total thickness. In some cases, it is possible to produce an "air profile" intended to compensate for positional variations in traverse, but that approach presumes that the variations are repeatable from traverse to traverse, and does not take account of any non-systematic variations. Thus, at least for thin webs, ultrasonic sensors have not provided the simplicity combined with accuracy which has been desired.

Another type of thickness sensor which has been employed commercially is illustrated in Horn et al. U.S. Pat. No. 3,617,872, assigned to the same assignee as the present invention. The system disclosed in that patent utilizes an eddy current sensor mounted on one side of the web, a metallic support on the other side of the web, and an air cushion supporting the head containing the eddy current sensor at a predetermined distance above the web. The eddy current sensor detects the distance between itself and the metallic support and, based on the assumption that the air cushion is always of the same thickness, is therefore a measure of web thickness. Such a system is not as easily implemented as might be desired in many circumstances and is also of less accuracy than desired.

U.S. Pat. No. 4,311,392 relates to thickness measuring apparatus and proposes a system utilizing both laser optics and an eddy current detector in the same measuring head. The proposed system utilizes laser optics for detecting the position of the front surface of the web, a backing roll for supporting the rear surface of the web, and an eddy current detector for producing a measurement relating to the distance between the head and the surface of the backing roll. Outputs of the two detectors are combined to produce a measure of sheet thickness corrected for variations in positional relationship between the backing roll and the measuring head. Apparent problems with the system can arise from using relatively complex optical systems in an industrial environment and the necessity for keeping the optics clean. The requirement that the optical source and detector be separately positioned to employ substantially different optical paths not only makes the system complex and potentially difficult to align, but the manner in which the complex optical path is associated with the eddy current sensor can render the system subject to inaccuracies due to relatively minor mechanical misalignment.

U.S. Pat. No. 4,276,480 relates to various forms of thickness measuring apparatus. Among the diagrams is FIG. 7 which illustrates a two head system for sensing both sides of an unsupported web, but using relatively complex optical paths and indirect sensing of independent reference lines, requiring the use of four optical light paths in all. The complexity would appear to relate not only to setup and maintenance, but would likely also affect the accuracy obtainable from a device constructed as disclosed.

Many of the thickness measuring systems known heretofore have been specially suited to their particular environment but have had little flexibility in adaptation to meet differing requirements. Thus, for example, the system of the aforementioned U.S. Pat. No. 4,311,392 would not appear to be suitable to a simple, accurate non-backing roll environment. The system described in the aforementioned U.S. Pat. No. 3,617,872 is of limited flexibility because of requirement for both pneumatic and electronic systems and the backing plate for riding against the rear of the web.

SUMMARY OF THE INVENTION

In view of the foregoing, it is a general aim of the present invention to provide a thickness measuring system which utilizes direct measurement of web thickness, but which is substantially more accurate and reliable than systems proposed heretofore.

In that regard, it is an object of the present invention to provide a non-nuclear web thickness measuring system of the two-head caliper type which increases reliability and accuracy by accounting for positional variations between the heads which might be encountered in practice.

In that connection, it is a related object to provide a traversing web thickness measuring system in which variations in measuring head position over the course of the traverse are accurately accounted for by maintaining a measure not only of head to web surface dimension but also of gap dimension.

A more detailed object is to provide a web thickness measuring system which utilizes a pair of measuring heads which can be traversed across the web in unison, each of the heads including sensors operating on energy reflected from the web in order to sense the respective surface positions of the web, and at least one of the heads including a sensor operating on a type of energy to which the web is transparent in order to provide information on the positional relationship between the two heads.

According to one particular aspect of the invention, an object is to increase the accuracy and reliability of a single head web thickness measuring system by utilizing a pair of sensors in the same measuring head whose positional relationship is optimized to produce thickness readings of maximum accuracy.

In accordance with a preferred form of the invention, there is provided a non-contact caliper-type gauge for measuring the thickness of a running web. The preferred form includes a pair of scanning heads mounted for traverse on opposite sides of the running web to form a gap, the approximate size of which is known. A reflectance transducer is mounted in each of the heads and directed at the gap for measuring the distance between the associated head and the facing surface of the web by means of energy transmitted from the transducer and reflected from the facing surface of the web. A transmission transducer is positioned in one of the heads for measuring the total gap dimension between the heads by means of energy transmitted through the web. Processing means determines and outputs web thickness measurements based on the reflectance transducer determinations of the distance to the respective surfaces of the web as modified by the transmission transducer determination of the total gap dimension.

In its preferred form, the reflectance transducers are ultrasonic transducers which transmit pulses of ultrasonic energy toward the web and detect ultrasonic energy reflected from the web along substantially the same path. The transmission transducer in such preferred embodiment is an eddy current sensor which responds to the metallic or conductive surface of the opposed head to provide a measure of the gap dimension between the heads.

It is a feature of the invention that the system is easily retrofit on existing equipment and can operate reliably in an industrial environment with little care, due to the highly reliable ultrasonic transducers for detecting the surfaces of the web, and the eddy current transducer which continuously monitors gap dimension.

It is a subsidiary feature of the invention that the information produced by the sensors for detecting the opposite surfaces of the moving web is also processed to determine the web passline or deviations from the web passline in order to apply passline corrections when appropriate.

In a more limited aspect, the invention provides a system where only a single traversing head is utilized to measure the thickness of a web supported on a metallic backing roll. In such system, an ultrasonic transducer mounted in the head directs ultrasonic pulses of energy at the web, detects reflected energy from the web surface, and determines the dimension between a reference in the head and the facing web surface. An eddy current sensor also mounted in the scanning head measures the dimension between a reference in the head and the surface of the metallic backing roll. Output means processes the signals produced by the two transducers to determine a measure of the thickness of the web. The sensors are mounted coaxially with the ultrasonic sensor being central and surrounded by the eddy current sensor to accommodate for slight misalignments in the scanning head while maintaining maximum precision.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
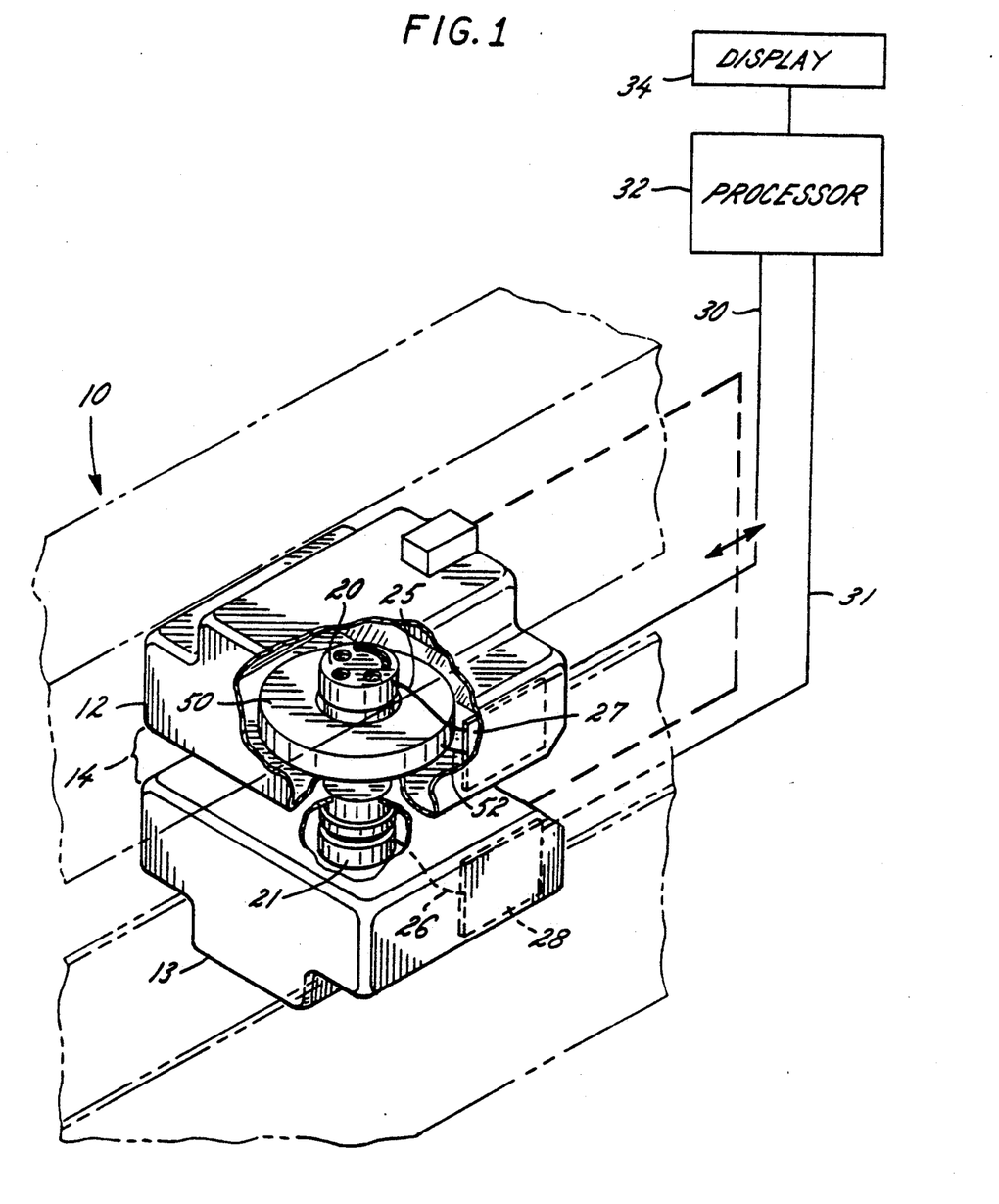
FIG. 1 is a perspective diagram illustrating a web thickness measuring system exemplifying the present invention.
Figure 2:
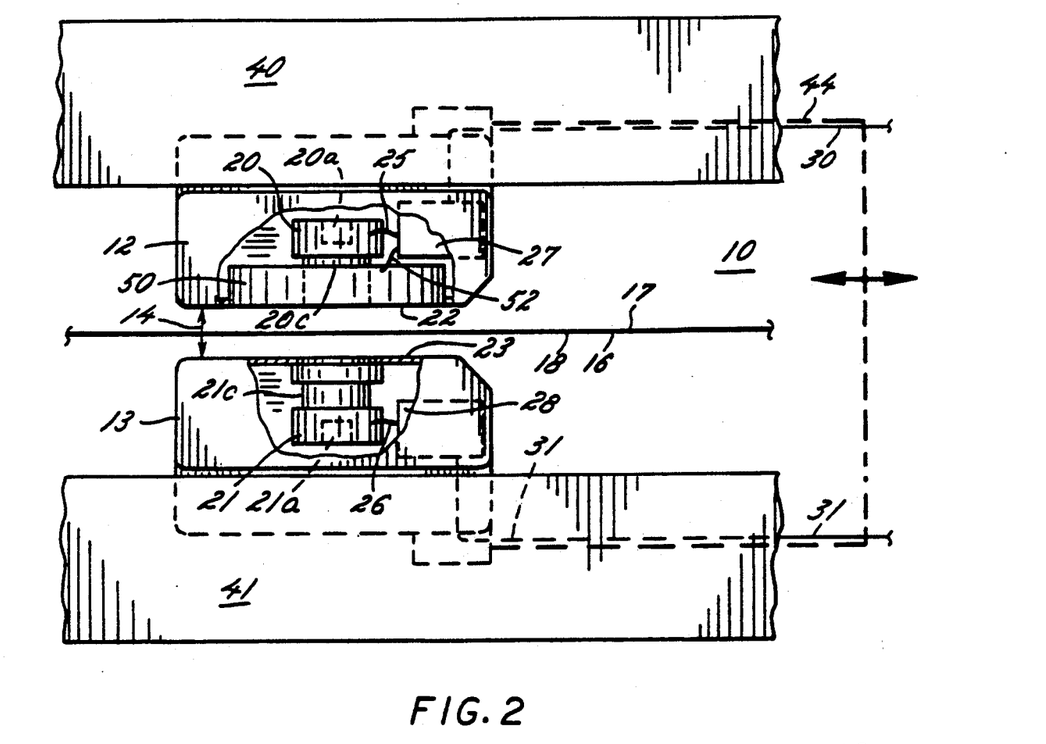
FIG. 2 is a front elevation of the system of FIG. 1.

Turning now to the drawings, FIG. 1 shows, in partly schematic perspective, a wet caliper measuring system exemplifying the present invention. FIG. 2 illustrates the same embodiment in elevation. Referring concurrently to those figures, it is seen that there is provided a measuring system generally indicated at 10 which includes a pair of measuring heads 12, 13 arranged in opposed relationship across a gap 14 which is intended for passage of a web 16 whose thickness or caliper is to be gauged.

In practicing the invention, the thickness measuring system 10 derives positional information regarding the surfaces 17, 18 of the web 16 by means of energy reflected from those surfaces, and uses that information to determine the web thickness, i.e., the distance between the surfaces 17, 18. In the preferred practice of the invention, ultrasonic transducers are utilized, although in certain cases other types of reflectance devices such as optical devices might be used.

It is seen in FIGS. 1 and 2 that each of the measuring heads 12, 13 is provided with an ultrasonic transducer 20, 21, respectively mounted in the measuring head 12, 13 in a predetermined relationship to mounting surfaces 22, 23. The mounting surfaces 22, 23 are preferably substantially planar and mutually facing. FIG. 2 illustrates that the ultrasonic transducers 20, 21 are thus mounted to face opposed surfaces 17, 18 of the web 16. Mounted within the ultrasonic sensors 20, 21 are transducers 20a, 21a, respectively, which emit pulses of ultrasonic energy in a direction substantially normal to the web. In the illustration of FIG. 2, the transducers are shown as dotted rectangles 20a, 21a located in the enlarged portion of the transducer housing coupled to the mounting surfaces 22, 23, respectively, by means of tube members 20c, 21c. The tubes 20c, 21c are adapted to provide a predetermined distance between the transducer and the measuring zone; it will be appreciated that the transducers can be mounted in any convenient location, with the pulse reception and timing being arranged to produce a signal which is representative of the distance between a known reference in the measuring head 20, 21, and the facing surface 17, 18, respectively, of the web 16. The location of the reference is unimportant so long as it remains constant for the system. For ease of understanding and visualization in explaining the present invention, the surfaces 22, 23 are taken as illustrative of the reference, although as described above the reference position can be scaled for a location more convenient to the electronics, when desired.

As noted above, each of the transducers 20a, 21a emits pulses of ultrasonic energy toward the facing surface of the web 16. Preferably, the same transducer is utilized to sense energy reflected from the facing surface. Signals are coupled by means of respective cables 25, 26 from the ultrasonic transducers to electronic circuit boards 27, 28. Circuitry in the electronic circuit boards 27, 28 controls the generation of pulses, the detection of reflected pulses, and measures the timing between the initiation of transmission of a pulse and the detection of a reflection as a measure of the distance between the reference associated with the particular sensor and the facing surface of the web. The processed signals originating from the respective transducers are coupled via associated cables 30, 31 (see FIG. 1) to a processor 32 which utilizes those signals to produce a measure of the distance between the facing surfaces 17, 18, or, in other words, the caliper of the wet. The processor 32 produces such a result and outputs it to an output means 34 in any convenient format. The output mechanism 34 in FIG. 1 is shown as a display device which can be a visual display, or a recording type display such as a magnetic tape or magnetic disc. The output device can also, of course, take the form of a process monitor or process control computer system which utilizes the data for process condition monitoring, closed loop control of the system which produces the web, quality control monitoring, and the like, all as is well known in this art.

As thus far described, the system of FIGS. 1 and 2 is capable of deriving information with respect to the distance between references in the two heads and the facing surfaces in the web, and can thus compute a measure of web thickness, but a measure which is not compensated for is variation in positional relationship between the two sensing heads. In accordance with the invention, means are provided for continually monitoring the dimension of the gap between the two transducers in order to accurately produce measurements of web thickness which are corrected for any systematic or non-systematic deviations in the distance between the two measuring heads.

Digressing for a moment, it is noted in FIGS. 1 and 2 that the measuring heads 12, 13 are mounted in a pair of channels 40, 41 which allow traverse of the measuring heads across the width of the web so as to allow production of thickness profiles of the web across its width. The channels 40, 41 and the mounting arrangements for the heads 12, 13 in those channels is illustrated only schematically. Such arrangements are commercially available, and are sometimes referred to in the art as O-frames. Such O-frames provide mounting for the respective heads and a drive which causes traverse of the heads in unison across the width of a machine, such as a papermaking machine. The dotted line connection 44 in FIG. 2 is intended to illustrate that the heads, although mounted independently in their respective brackets 40, 41 are intended to traverse together across the width of the machine in order to produce web thickness profiles. It will be appreciated that even the most highly machined and stabilized O-frame members can allow relative movement between the heads 12, 13 during a traverse which should be expected to produce positional variations between the heads of 0.010 inches or more. Other factors normally associated with the industrial environment such as vibration, temperature variations, and the like could be expected to compound this error. It will thus be appreciated that if the heads were allowed to traverse the width of the machine without any correction, errors of a magnitude which are unacceptable in many industries would result.

Thus, in practicing the present invention, sensor means are associated with the pair of scanning heads in order to produce a signal related to the actual distance between those heads at any particular point in their traverse, such that the distance information can be combined with thickness measurements taken more or less contemporaneously to produce a corrected measure of web caliper. In the illustrated embodiment, the distance sensing means includes a transducer 50, preferably an eddy current transducer, which operates on energy to which the web 16 is transparent, and to which the opposed measuring head 13 is not. An eddy current sensor can be conceptualized as a magnetic coil serving as a primary. The position of the movable secondary, in this case the measuring head 13, serves to control the magnitude of the voltages and currents in the primary, which thus are a measure of the distance between the measuring heads.

It is significant that the head 13 is shaped to provide an attribute which is reliably and conveniently sensed by the detector 50. In the illustrated embodiment, when using an eddy current sensor 50, the head 13 is shaped such that a planar surface 23 of conductive metal is disposed in a plane substantially parallel to the eddy current sensor 50, such that the plane of metal as it approaches or moves away from the eddy current sensor 50 is accurately sensed. It is also noteworthy that the arrangement is capable of directly sensing the gap between the two heads, rather than providing an indirect measurement by way of sensing respective reference lines. A cable 52 couples the eddy current sensor to the circuit board 27 such that the electronic circuitry of the circuit board 27 converts the signal to data relating to the distance between the reference planes in the two measuring heads 12, 13. While it is convenient to think of that distance as the distance between the planar surfaces 22, 23, as noted above any convenient imaginary reference plane in the system can be utilized so long as the processor 32 takes account of the distance information produced by the ultrasonic sensors on the one hand and the gap sensor on the other to produce information which leaves as a result of the computation only the thickness of the web 16.

Figure 3:
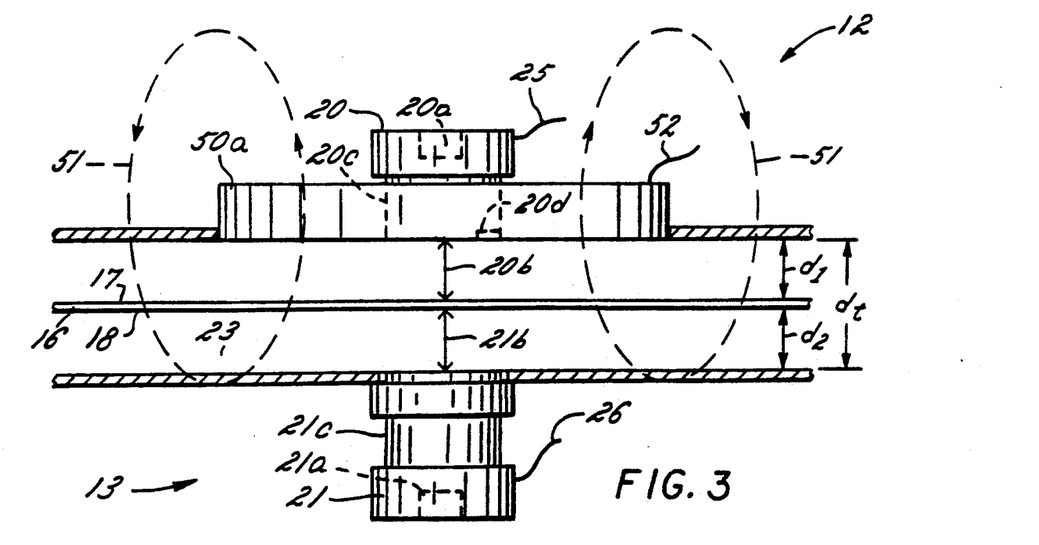
FIG. 3 is a diagram better illustrating the geometry of detection of the system of FIGS. 1 and 2.

The manner in which that is accomplished will be better understood with reference to FIG. 3, which illustrates the geometrical relationship between the detectors and web in the system of FIGS. 1 and 2. Ultrasonic sensors 20, 21 are shown as facing the web 16. Double-headed arrows 20b, 21b illustrate the paths for ultrasonic energy for the respective transducers. Since the transducers are positioned substantially normal to the facing surface of the web, the path of incidence and the path of reflectance are substantially the same. If it is possible, of course, to utilize separate transducers for transmission and reception in each ultrasonic sensor, and the paths then would obviously be non-coincident. However, FIG. 3 shows the preferred form of the invention in which the paths are coincident.

Referring to ultrasonic sensor 20 in particular, the transducer 20a, which is the transmitting and receiving element in the sensor, is caused to emit a pulse of ultrasonic energy toward surface 17 of the web 16. At the time the pulse is emitted, a timer within the circuitry 27 is initiated. The radiation travels toward the web as indicated by the arrow 20b, and is reflected from the surface 17 of the web back toward the transducing element 20a of the sensor 20. Receipt of reflected energy at the transducing element 20a of the sensor 20 halts the timer within the circuitry 27. Since the velocity of sound in the medium (typically air) is known, and the travel time to the web and back has been measured, the distance between the transducing element and the web, designated $d_1$ in FIG. 3 is calculated directly. Transducer 21 and its transducing element 21a associated with a similar path for energy 21b, has its own timer on circuit board 28 so that distance $d_2$ is measured in a similar fashion. It is noted that distances $d_1$ and $d_2$ need not, and usually are not, the same, but that they are measured in the same way using independent transducers aimed at the respective surfaces 17, 18 of the web 16.

In accordance with the invention, additional means are provided for measuring the total distance $d_t$ so that the computer associated with the system can operate subtractively to provide a measure of the thickness of the web corrected for the actual measured distance between the transducer elements at the time the thickness measurement was taken. Stated algebraically, the web thickness is $$t_w = d_t - (d_1 + d_2) \tag{1}$$

In the preferred implementation, the distance $d_t$ is measured by means of an eddy current transducer 50 fixed with respect to one of the sensor heads 12 and adapted to sense change in position of that head with respect to a reference plane 23 in the opposed sensor 13. The eddy current sensor is shown as producing lines of flux schematically illustrated at 51 which intercept the conductive metallic reference plate 23. The signal produced by the eddy current sensor 50 thus varies in magnitude based on the number of lines of flux cut by the plate 23 and thus by its relative position with respect to the eddy current sensor 50. Thus, the signal produced on output line 52 is a direct measure of the distance $d_t$. Alternatively, the signal on line 52 can be scaled to reflect a measure of the variation in head position from a predetermined nominal gap. In any event, the signal on line 52 is taken as a measure of gap dimension $d_t$, and such signal can be scaled in the processor 32 (FIG. 1) to provide an input to the above-stated equation 1. Thus, the gap dimension $d_t$ is used with the distance signals $d_1$, $d_2$ produced by sensors 20, 21, respectively, to produce a direct measure of web thickness.

Figure 5:
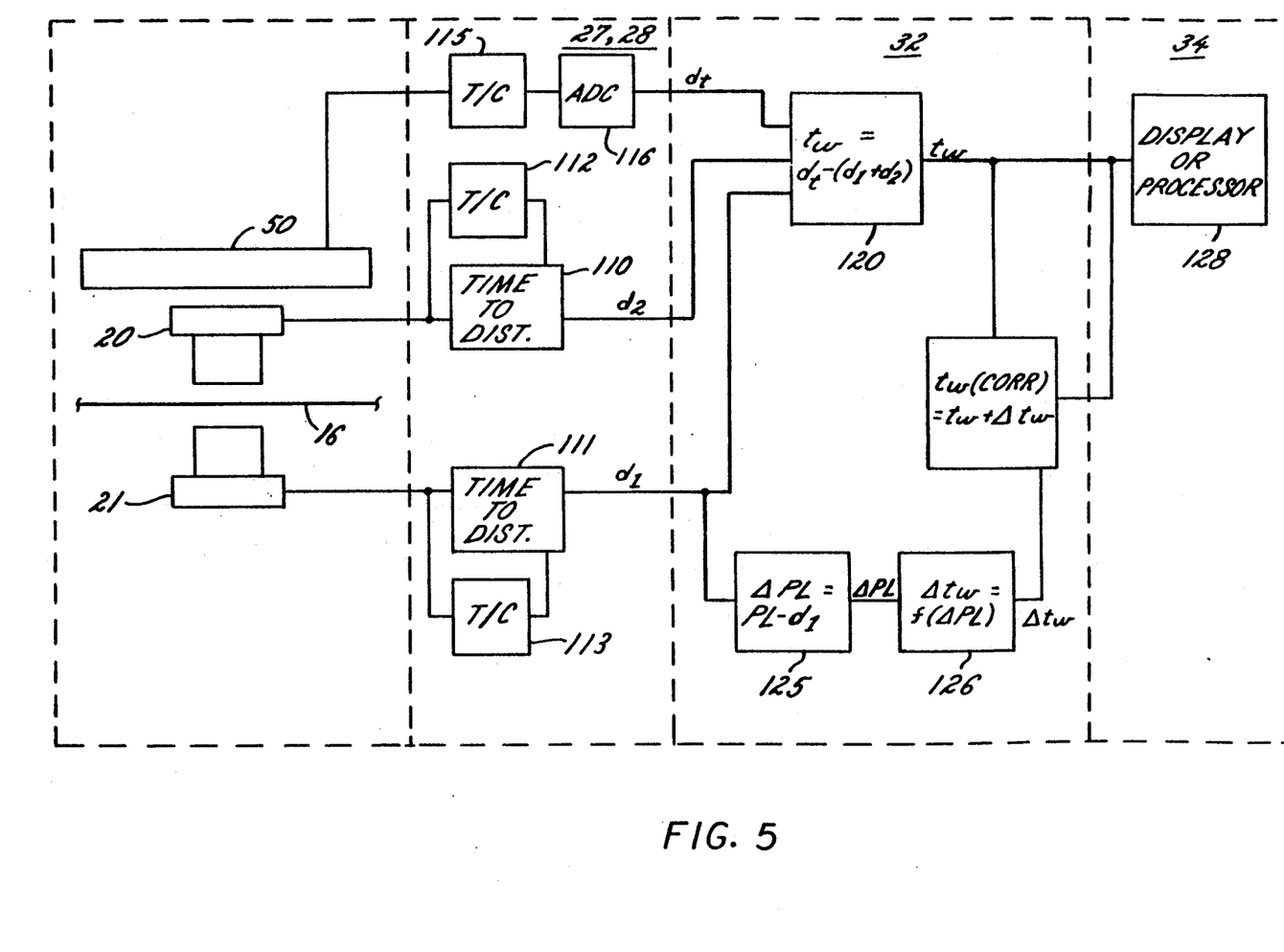
FIG. 5 is a block diagram better illustrating the signal processing means which produces accurate measurements of web caliper from the sensor signals.

Turning now to FIG. 5, there is shown a block diagram better illustrating the signal processing aspects of the invention. The diagram is segregated into four sections, with the leftmost section including ultrasonic transducers 20, 21, eddy current transducer 50, and the web 16. Sequential sections of the drawing represent the signal processing components on circuit boards 27, 28, the processor 32, and the output device or display 34.

Referring in greater detail to FIG. 5, it is seen that that the ultrasonic transducers 20, 21 are coupled to control elements in the respective circuit boards 27, 28 which include time to distance converters 110, 111. The time to distance converters are illustrated as functional elements, but it will be appreciated by those skilled in the art that such elements contain the ultrasonic transmission and reception circuitry as well as the timer. The circuitry functions to transmit an ultrasonic pulse currently with initiation of the period of a timer, then to receive the reflection of ultrasonic energy and thereupon terminate the interval of the timer. The time to distance converters 110, 111 then convert the measured time intervals, knowing the speed of sound in the medium (typically air), to compute the distances between a reference in the ultrasonic transducer and the facing surface of the web 16. The circuitry for controlling an ultrasonic transducer in that fashion is commercially available and is not illustrated in detail, but the blocks 110, 111 are intended to illustrate the performance of those functions.

Because the system is intended for use in an industrial environment which can tolerate substantial changes in temperature, means are provided for temperature compensating the signals produced by the ultrasonic transducer. Temperature compensation for the ultrasonic transducers is illustrated by blocks 112, 113 in FIG. 5. In order to produce a direct measure of the speed of the ultrasonic pulses, the ultrasonic transducers are configured to transmit a pulse of energy to a calibrating object at a known distance, detect the time interval of transmission and receipt, and use the known distance and measured travel time to determine a reference signal relating to the speed of sound at the temperature to which the device is subjected. FIG. 3 illustrates a small calibrating tab 20d associated with the sensor 20. The tab does not interfere in a substantial way with transmission of energy to the web, but does cause a reflection back toward the sensor. Normally, the sensor establishes a time window for receipt of a reflection whose travel time would require travel to about the passline of the web. Thus, reflections from the temperature calibrating tab 20d would not be in the window. Periodically, however, the time window is adjusted to detect reflections from the calibrating tab 20d, and the computation made based on the known distance and the measured travel time to compute the velocity of the ultrasound pulses in the medium, and to then use that velocity as a temperature compensated signal for calculating $d_1$ or $d_2$, the distances to the web.

Temperature compensation is also preferably provided for the eddy current transducer 50. The temperature compensation for the eddy current transducer is represented by a block 115. Preferably, the temperature compensation for the eddy current transducer is accomplished in an analog fashion by a device having a temperature dependent characteristic opposite to that of the eddy current sensor. Such means are well known in the art. They will not be further described herein except to note that they are preferably implemented in analog fashion by utilization of a temperature dependent voltage source mounted on the eddy current sensor such that the eddy current sensor produces an output signal which is temperature independent. As shown in the drawing, the compensated analog signal is then passed to an analog-to-digital converter 116 which is illustrated as an element of the circuit boards 27, 28, but which can also reside for purposes of economy in the computer 32. As a further alternative, the compensated signal can be combined in analog form with analog signals from the ultrasound detectors to produce an analog thickness signal compensated for gap dimension. In any event, however, the analog signal from the eddy current transducer 50 as temperature compensated is utilized to produce a gap dimension $d_t$ which is processed with the $d_1$ and the $d_2$ signals to produce a measure of the caliper or thickness of the web.

The elements illustrated as making up the processor 32 illustrate the manner in which the signals are combined for producing the web thickness output. It is seen that a block 120 performs the computation of equation 1, i.e., subtracts from the total gap dimension $d_t$ the sum of the signals produced by the ultrasonic sensor $(d_1+d_2)$. In the simplest form of the invention, that thickness signal is output directly to display or processor 34. The system in which the thickness signal produced by block 120 is directly output as a measure of web thickness is currently believed to encompass a majority of applications, and will provide accuracy comparable to that expected from nuclear thickness gauges. However, there are a number of occasions where the web is of a character which will partly interfere with transmission of energy through the web, and those applications are expected to be at least partly sensitive to the position of the passline. For example, if the web is of the type which is loaded with a conductive polymer or has a conductive surface, the web will partly interfere with the coupling between the eddy current sensor 50 and the opposite head. While the conductive web will not make the system inoperable, it will produce a condition where the thickness measurement produced in block 20 is accurate only when the web is in a predetermined passline position, and is in error in a known manner when the passline varies.

The system of the invention provides a convenient means for accommodating a passline variable system in that the ultrasonic transducers 20, 21 produce information which not only relates to the thickness of the web, but also its actual passline. Thus, additional components in the processor means 32 are provided for the special case where the system is passline sensitive. A first of those components identified as block 125 in FIG. 5 determines the passline deviation from one of the ultrasonic transducer signals. In the illustrated example, the block 125 calculates the passline deviation $\Delta PL$ by comparing a known passline position PL stored in the processor with one of the ultrasonic distance signals $d_1$. The stored measure PL is intended to represent the distance $d_1$ sensed by the ultrasonic transducer 21 when the web is in its preferred passline position. Thus, when the web is in the preferred passline, $\Delta PL$ will be zero. However, whenever the web deviates from that passline position, a positive or negative $\Delta PL$ will be determined.

A second block 126 stores the function (such as in a table) relating thickness correction to passline variation. As an example, assuming the function is linear, it is possible to calibrate the system by positioning a web of the type intended to be measured first at one of the detectors, then at the other, determining measurements for both thicknesses and calculating a passline correction function $f(\Delta PL)$ from those measurements. Such a correction function is represented by the block 126. When a passline deviation $\Delta PL$ is sensed by the block 125, that deviation is applied to the block 126 to determine a thickness correction $\Delta t_w$ which should be applied to the thickness measurement determined by block 120. A block 128 thereupon determines a corrected thickness measurement $t_w(corr)$ which is equal to the sum of the computed thickness measurement plus the correction function determined by block 126. The corrected function is then output to the display or processor 34.

It is emphasized that passline deviation correction is currently intended as an optional feature, and that most applications are expected to be satisfied with the thickness correction as determined in processing block 120. However, in those applications where the passline interferes with one or more of the transducer signals, most likely with the transmission transducer signal, the additional elements illustrated in FIG. 5 can be added without substantial additional cost (the transducer signals are already available) to yield the necessary accuracy even in those difficult situations. The substantial versatility of the system according to the invention will thus be appreciated.

In its most typical application, a system in accordance with the invention will provide caliper measurements across the width of a running web. In such a system, the traverse will be at a nominal speed, the signals from the sensors will be sampled at a predetermined rate, and new readings produced at predetermined increments as the scanner moves across the web. It has been found to be both possible and convenient using the system in accordance with the present invention to produce thickness measurements during traverse of at least five per inch as the scanning heads traverse the width of the web. In practicing the invention, the sampling times for taking analog signals from the sensors and passing them to the computer are coordinated such that the gap correction provided by the processor relates positionally to the thickness measurements provided by the ultrasonic transducers. A currently preferred method of accomplishing that that is to process the eddy current and ultrasonic transducer signals in an analog fashion to produce a single thickness measurement signal coordinated for gap dimension, then to sample and digitize that corrected signal as needed. In a system utilizing digital processing, the signals from the eddy current sensor and ultrasonic sensors are sampled in such a way that the eddy current sensor is measuring the gap at about the same time that the ultrasonic sensors are measuring the position of the web surfaces to produce continually updated and corrected information during the course of the traverse.

With respect to accuracy, the difficulty or practical impossibility of configuring a mechanical system for high accuracy scanning of relatively thin webs was pointed out above. For example, it was pointed out that practical mechanical tolerances would not readily allow determining thickness of a nominal 100 mil web with an accuracy of about 1%. Even assuming an "air profile" was used, the non-systematic variations which can be expected in an industrial environment would render difficult if not impossible the achievement of such an accuracy standard.

However, in practicing the invention, the achievement of such an accuracy for a relatively thin 100 mil web can readily be achieved. Such a system can be configured utilizing an eddy current sensor produced by Kaman, Model 60U to produce a 10 mv per mil signal which can be digitized with 12 bit resolution to produce a digital resolution of 0.24 mils. Thus, the distance between the sensing heads $d_r$ can be measured with substantial accuracy commensurate with the desired total system accuracy.

The ultrasonic sensors can be obtained from Contaq Technologies of Bristol, Vt. and are capable of producing about an 0.7 mil resolution for a single reading. For a moving wet, adding and averaging single measurements will improve resolutions as a regressive statistical function. For example, four sample averaging yields a resolution of 0.59 mils. Thus, using a scanning rate of 3.3 inches per second (for traverse of the paired heads across the web), and an 0.7 mil resolution for the ultrasonic sensor, and four samples per reading, a 1% resolution of a 53 mil target is achievable. If the scanning rate is slowed to 2.5 inches per second, a 1% resolution of a 43 mil target is achievable. Utilizing that resolution for the ultrasonic sensors and an eddy current sensor whose resolution was discussed above, it is entirely possible to produce web caliper measurements on a running basis which are more accurate than those achievable heretofore. Furthermore, such measurements are available at relatively inexpensive cost, considering the accuracy and resolution, and in a system expected to be highly reliable and ruggedized for use in the industrial environment.

The relative position of the sensors of FIG. 3 is also noteworthy. It is seen that the eddy current sensor 50 is arranged in a donut configuration with an aperture 50a of a size adequate to accommodate the ultrasonic sensor 20. Thus, in the dual sensor head 12, a coaxial sensor arrangement is provided which has the ultrasonic sensor 20 arranged in the center for direct transmission and receipt of reflected energy to and from the web, and the eddy current sensor 50a surrounds the ultrasonic sensor for providing an averaged reading of distance between the two scanning heads. Assuming that the scanning frames are such that the sensors are maintained in substantial face-to-face alignment, the accuracies for distance measurement disclosed above can be achieved. Furthermore, a small degree of misalignment can be tolerated, particularly in view of the coaxial arrangement discussed above.

Figure 4:
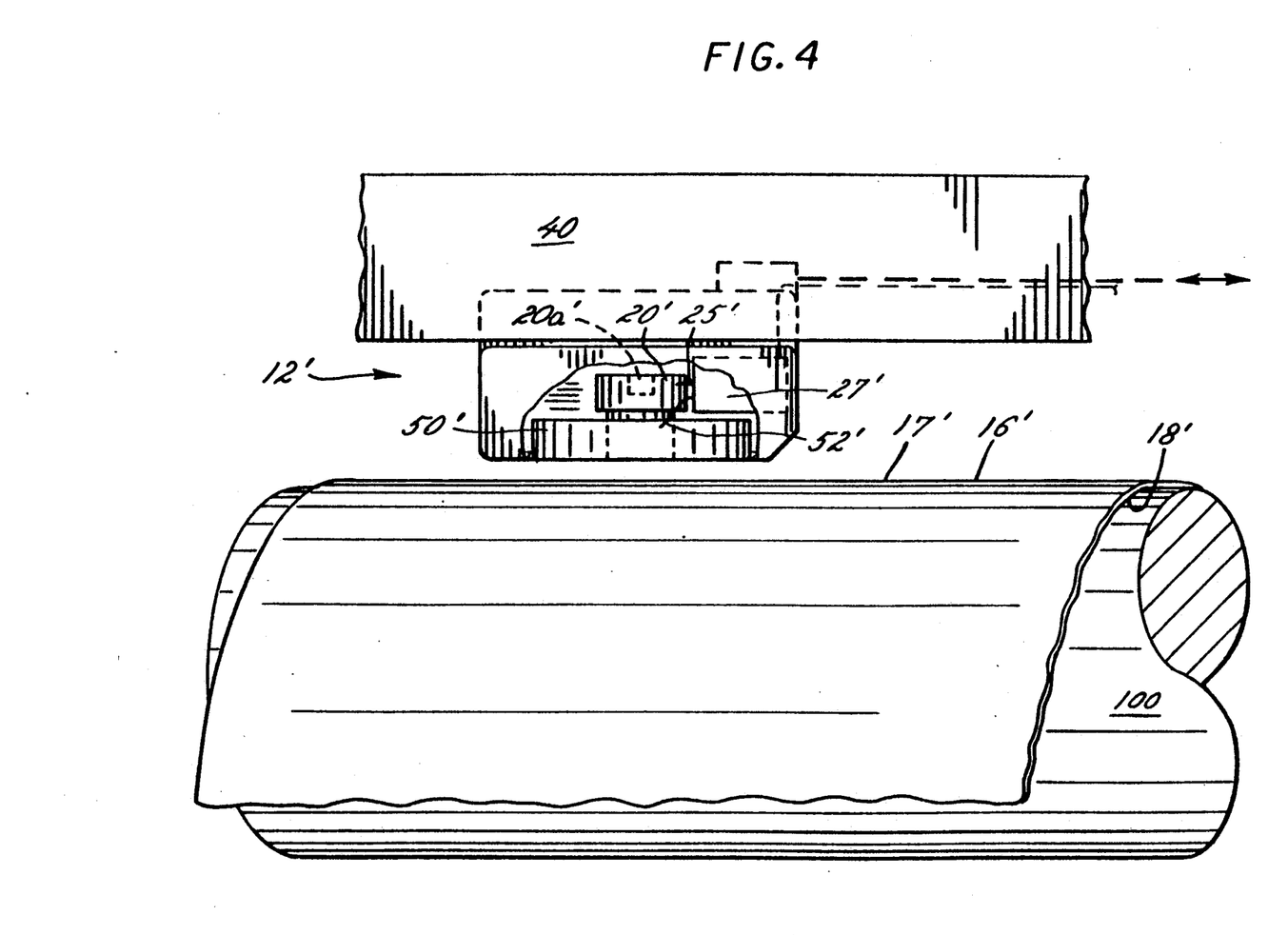
FIG. 4 is a diagrammatic view illustrating a second embodiment of the present invention.

In some applications of the invention, adequate accuracy can be obtained with a significantly simplified system utilizing the coaxial feature of the dual sensor arrangement wherein one of the sensor types uses energy reflected by the web and the other uses energy to which the web is transparent. Such an arrangement can be utilized without the necessity for a second head in a backed web arrangement such as illustrated in FIG. 4. FIG. 4 shows a scanning head 12' adapted for traverse in a bracket 40' for sensing the thickness of a web 16' disposed with a surface 17' facing the head 12'. The second sensing head is eliminated and instead a backing roll 100 is provided on which the web 16' is supported. There is a substantial wrap of the web 16' over the roll so that the rear surface 18' of the web is in intimate contact with the smooth metallic surface of the roll 100. The coaxial sensor arrangement then utilizes the eddy current sensor 50' to detect the distance to the surface of the roll 100 and thereby a measure of the distance of the non-facing surface 18' of the web, whereas the ultrasonic sensor 20' provides a measure of the distance to the facing surface 17' of the web. Thus, a calculation is made in computer 32' (not shown in FIG. 4), or the signals are processed in analog fashion in a summing amplifier, to subtract the distance measured by the ultrasonic sensor 20' from the distance measured by the eddy current sensor 50' to provide a measure of the thickness of the web 16' compensated for traversing variations or other non-systematic variations in distance between the head 12' and the web 16'. The coaxial arrangement of the sensors is particularly important in this embodiment because any misalignment of the scanning head 12' will have a minimum impact on the central energy transmission and reflection for ultrasonic sensor 20' while providing an averaging of the distance measured by the outer concentric eddy current sensor 50'. Thus, the eddy current sensor 50' will provide a distance measurement for the distance to the non-facing surface 18' of the web which averages at least a portion of the misalignment with respect to the ultrasonic measurement which is taken at the center of the coaxial sensor. Thus, even when slightly misaligned, the coaxial arrangement will provide more accurate readings of the caliper of the web 16'.

The coaxial arrangement illustrated in FIG. 4 has the further advantage of compactness, and the ability to take samples of the distance from the head to the respective surfaces 17', 18' of the web at about the same instant in time and for about the same increment of web travel over the roller. Furthermore, the types of sensors utilized in the coaxial arrangement, i.e., an ultrasonic sensor for reflected energy and an eddy current sensor for energy to which the web is transparent, provide not only what is believed to be maximum reliability in such a system, but an arrangement which can be easily adapted to an existing machine roller (such as a calendar roll in a papermaking machine) to provide accurate, repeatable and reliable thickness measurements in a retrofit environment at an affordable cost.

It will now be appreciated that what has been provided is an improved web caliper measuring apparatus. In its preferred form, a pair of scanning heads are provided for utilizing reflected energy from each of the surfaces of the web to determine web thickness. One of the measuring heads is provided with an energy sensing system utilizing energy to which the web is transparent for determining the distance between the heads, thereby to compensate for variation in distance between the heads during traverse across the width of a web. Advantage can also be taken of the fact that the reflectance transducers provide passline information to make a passline correction when necessary.

In a second form of the invention, advantage is taken of the coaxial arrangement of the reflected and transparent energy sensors to utilize only a single coaxial pair cooperating with a backing roll to produce reasonably precise measurements of web thickness, in the case where a second sensor is impractical or undesirable.

What is claimed is:

1. A system for measuring the thickness of a running web comprising, in combination, a traversing scanning head including first and second sensors, the first sensor being a reflectance sensor for directing energy at the web for reflection thereby and detecting reflections from a first surface of the web thereby to determine the distance between the scanning head and the first surface of the web, the second sensor being a transmission sensor for projecting energy through the web and for determining a total gap dimension between the reflectance sensor and a reference means having a predetermined relationship with respect to a second surface of the web, the second sensor coaxially surrounding the first sensor, and computer means for combining to the signals from the first and second sensors for producing a measure of the thickness of the web.

2. The combination as set forth in claim 1 wherein:

the reflectance sensor is an ultrasonic sensor for directing ultrasonic energy at the web and detecting ultrasonic reflections from the first surface of the web, and the transmission sensor is an eddy current sensor and the reference means is a conductive reference means.

3. The combination as set forth in claim 2 wherein the conductive reference means comprises:

a second scanning head mounted for traverse opposite the first scanning head and having a conductive surface defining said conductive reference means, the eddy current sensor in the first scanning head being constructed and arranged to sense the distance between said first scanning head and the conductive surface of the second scanning head, and a second ultrasonic sensor mounted in the second sensing head for directing ultrasonic radiation at the second surface of the web for reflection thereby, and detecting ultrasonic reflections from the second surface of the web.

4. The combination as set forth in claim 3 wherein all of said sensors are repetitively sampled during the traverse of the scanning heads, the sampling rates of the sensors being compatible to produce web thickness measurements corrected for local variations in the distance between the first and second heads.

5. The combination as set forth in claim 4 wherein the computer means produces at least five independent measurements of web thickness per inch of web width during traverse of the scanning heads.

6. The combination as set forth in claim 2 wherein the conductive reference means comprises a smooth metallic roller for supporting the second surface of the web, the eddy current sensor in the first scanning head being constructed and arranged to sense the distance to the surface of the metallic roller and thereby to the supported second surface of the web.

7. The combination as set forth in claim 6 wherein the first, and second sensors are repetitively sampled during the traverse of the scanning head, and the sampling rates of the first and second sensors are compatible to produce web thickness measurements compensated for local variations in the distance between the surface of the metallic roller and the scanning head.

8. The combination as set forth in claim 7 wherein the computer means produces at least five independent measurements of web thickness per inch of web width during traverse of the scanning head.

9. The combination as set forth in claim 3 wherein the computer means further comprises means for determining passline of the web from at least one of the ultrasonic sensors, and means for producing a measure of the thickness of the web corrected for passline deviations.

10. A non-contact caliper-type gauge for measuring thickness of a running web, the gauge comprising, in combination:

a pair of scanning heads mounted for traverse on opposite sides of the web to form a gap of approximate predetermined dimension therebetween, a reflectance transducer in each head directed at the gap for measuring the distance between the associated head and a facing surface of the web by means of energy transmitted from the transducer and reflected from the facing surface cf the web, a transmission transducer positioned in one of the heads for measuring the total gap dimension by means of energy transmitted through the web, and processing means for determining and outputting web thickness measurements based on the reflectance transducer measurements of the distance to the respective surfaces of the web as modified by the transmission transducer measurement of the total gap dimension.

11. The combination as set forth in claim 10 wherein the reflectance transducers are ultrasonic transducers constructed and arranged to direct pulses of ultrasonic energy at the web and detect reflected ultrasonic energy from the facing surface of the web.

12. The combination as set forth in claim 11 wherein the transmission transducer is an eddy current transducer mounted in one of the heads, and a conductive reference in the second head for sensing by the eddy current transducer to provide an indication of the size of the gap between the heads.

13. The combination as set forth in claim 12 wherein the ultrasonic transducer and eddy current transducer in said one of the heads are coaxially arranged with the eddy current transducer surrounding the ultrasonic transducer.

14. The combination as set forth in claim 12 wherein the ultrasonic transducer has an output which is sampled during the traverse of the scanning head, and wherein multiple samples of the ultrasonic transducer are averaged to increase the accuracy of the web thickness measurements.

15. The combination as set forth in claim 14 wherein the eddy current sensor has an output which is sampled, the sampling rates of the ultrasonic and eddy current sensor being compatible to produce web thickness measurements corrected for local variations in the dimension of the gap during traverse.

16. The combination as set forth in claim 15 wherein the sampling rates produce at least about five web measurements per inch of web traverse.

17. The combination as set forth in claim 10 wherein the processing means further includes means for determining deviations in a passline of the running web from at least one of the reflectance transducers, and means for correcting the web thickness measurements based on passline deviations.

18. The combination as set forth in claim 11 wherein the processing means further includes means for determining deviations in a passline of the running web from at least one of the reflectance transducers, and means for correcting the web thickness measurements based on passline deviations.

19. The combination as set forth in claim 12 wherein the processing means further includes means for determining deviations in a passline of the running web from at least one of the reflectance transducers, and means for correcting the web thickness measurements based on passline deviations.

20. A non-contact, non-nuclear caliper-type gauge for measuring thickness of a running web, and comprising, in combination:

first and second scanning heads, traverse means for mounting the scanning heads in opposed relationship to define a gap between the heads for the running web and traversing the heads across the width of the running web, an ultrasonic transducer mounted in each of the heads for directing ultrasonic energy at the web, measuring reflected ultrasonic energy from the surface of the web facing the associated head and producing a measure of the distance between a reference in the head and the facing surface of the web, a second transducer mounted in one of the heads and responsive to energy transmitted through the web for producing a running measure of the distance between the reference points of the two heads as the heads are traversed across the web, and means for computing the web thickness based on the ultrasonically determined distances of the respective references to the opposed surfaces of the web, and the distance as determined by the second transducer between the references, thereby to produce a web thickness measurement by detecting both web surfaces while compensating for local variations in the distance between the ultrasonic transducers.

21. The combination as set forth in claim 20 wherein the second transducer is an eddy current transducer having a central aperture, the eddy current transducer being mounted in said one of the heads in coaxial and surrounding relationship to the ultrasonic transducer mounted in said one head.

22. The combination as set forth in claim 20 in which the means for computing web thickness includes means for determining deviations in passline of the running web based on at least one of the ultrasonically determined distances, and means for correcting the web thickness measurement for passline deviations.

23. A web thickness gauge for determining thickness of a running web of material and capable of scanning across the width of a running web of said material, the gauge comprising, in combination:

a smooth metallic backing roll for supporting the web in a measurement zone, traversing means for mounting a scanning head for traverse with respect to the backing roll such that the web supported on the roll is positioned opposite the scanning head during its traverse, an ultrasonic transducer in the scanning head for directing ultrasonic energy at the web and receiving energy reflected from the surface of the web, first signal processing means associated with the ultrasonic transducer for producing a first signal relating to the distance between the surface of the web and the ultrasonic transducer, eddy current transducer means responsive to energy to which the web is transparent, the eddy current transducer being directed at the web and backing roll for determining the location of the surface of the backing roll, second signal processing means associated with the eddy current transducer for producing a second signal relating to the gap between the head and the surface of the backing roll, and means responsive to the first and second signals for producing an output signal relating to the difference between said differences, thereby to indicate the thickness of the web corrected for variations caused by the traversing means.

* * * * *